G. WHEAT.
STORAGE BATTERY CASE.
APPLICATION FILED NOV. 23, 1915.
1,199,846.
Patented Oct. 3, 1916.
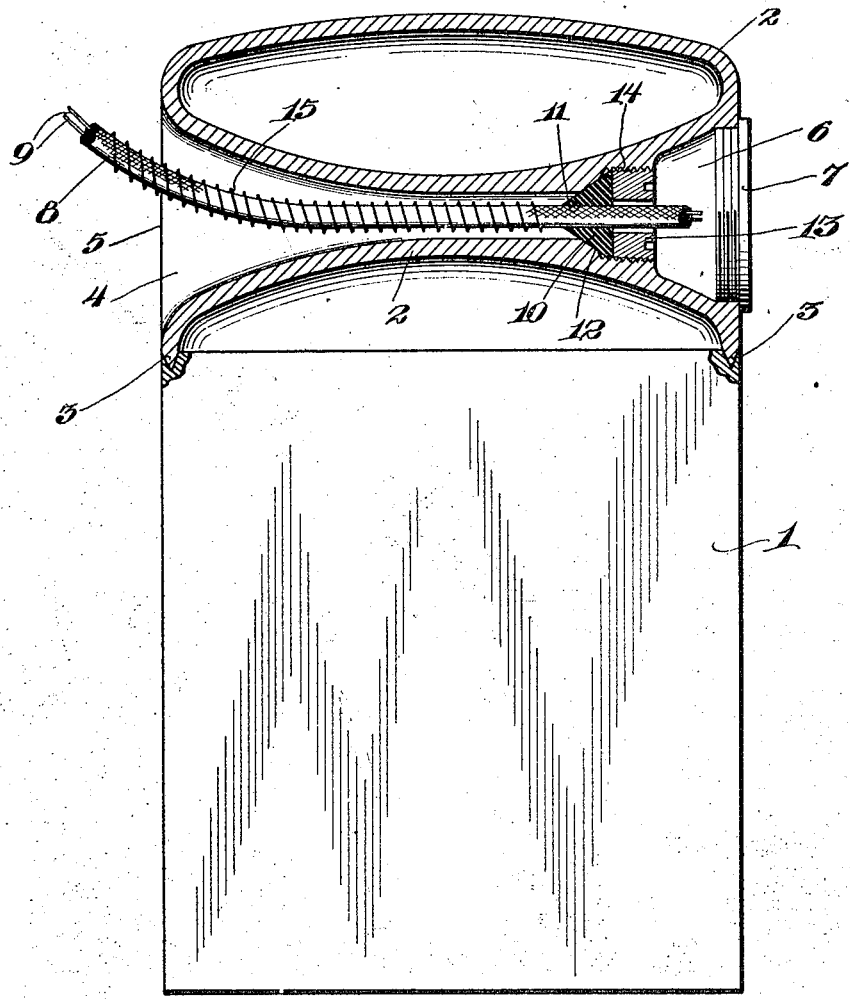
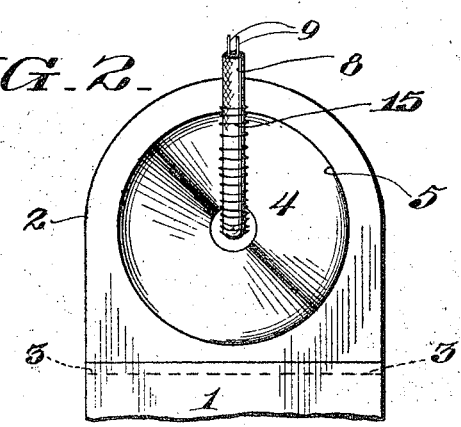
WITNESSES:
Wm Conway
C. R. Ziegler.
INVENTOR
Grant Wheat,
BY Joshua R. H. Potts.
HIS ATTORNEY

UNITED STATES PATENT OFFICE.

GRANT WHEAT, OF PHILADELPHIA, PENNSYLVANIA.

STORAGE-BATTERY CASE.

1,199,846.      Specification of Letters Patent.      Patented Oct. 3, 1916.

Application filed November 23, 1915. Serial No. 62,937.

*To all whom it may concern:*

Be it known that I, GRANT WHEAT, a citizen of the United States, residing at Philadelphia, in the county of Philadelphia and State of Pennsylvania, have invented certain new and useful Improvements in Storage-Battery Cases, of which the following is a specification.

My invention relates to improvements in storage battery cases, and more particularly to an improved top or cap for the open ends of storage battery cases, the object of the invention being to provide improved means for connecting the wire-containing cord which will permit a free movement of the cord in all directions without any danger of breaking the cord, and without undue wear.

My invention is particularly adapted for use in connection with the cases of storage batteries for miners' lamps in which use the cord connecting the lamp with the storage battery is subjected to a great deal of movement in all directions by reason of the movement of the body of the miner, and hence it is of the utmost importance to provide a connection or mounting for the cord which will permit it such movement without danger of breakage or wear.

With these and other objects in view, the invention consists in certain novel features of construction and combinations and arrangements of parts as will be more fully hereinafter described and pointed out in the claims.

In the accompanying drawings: Figure 1 is a view showing a battery case in elevation and illustrating my improved top in position thereon, the latter being shown in section, and Fig. 2 is a fragmentary side view of Fig. 1.

1 represents a storage battery case such as commonly used in connection with storage batteries, and particularly for those in connection with miners' lamps, and 2 is my improved cap which closes the upper end of the case 1, and is secured thereto in any approved manner.

While, of course, I am not limited to the manner of connecting the cap and the case, I have shown the two connected by a tongue and groove 3.

The cap 2 is provided with a cord-receiving pocket 4, the outlet end 5 of which is relatively large, is circular or rounded in cross section, and is located at one side of the cap 2. The pocket 4 extends throughout the greater portion of the width of top 2, and at its inner end communicates with a chamber 6 normally closed by a screw plug 7.

8 is a cord which is commonly used, and which is of insulation carrying two electric wires 9, and is adapted to convey the current to the lamp. This cord 8 extends through the pocket 4 into chamber 6, and from the latter is electrically connected with the storage battery in any approved manner.

To effectually secure the cord in the pocket and chamber, I provide a clamping ring 10 preferably of soft rubber having a central opening 11 receiving the cord 8 and of general conical shape on its exterior. This ring 10 is forced against a beveled bearing face 12 by means of a circular plug 13, which is screwed into a threaded socket 14 in the inner end of chamber 6. When this plug 13 is screwed home, it operates to clamp the ring 10 around the cord 8, and securely hold the latter against longitudinal movement.

15 is a wire coil which is located around the cord 8, and not only prevents wear of the cord by reason of its rubbing action against the inner face of the pocket 4, but also prevents sharp bending of the cord.

It will be noted that with my improvements, the cord 8 can be moved in all directions without any danger of breaking the cord or its electric connections and my improvements are adapted for use in connection with various forms of storage battery.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A storage battery case having a pocket therein extending transversely of the case, and throughout the greater portion of the width of the case, said pocket having a relatively wide flaring outer end flush with the outer wall of the case, an electric wire-containing cord projecting through the pocket into the case, said cord rigidly secured at the inner end of the pocket and capable of lateral movement in all directions at the outer end of the pocket, substantially as described.

2. A device of the character described, comprising a casing having a pocket in one side, said pocket having a relatively wide flaring outer end, said device having a pocket in its other side, an electric-wire-containing cord projected through the pocket into the casing, means securing the cord against longitudinal movement, a wire coil around the cord extending throughout the length thereof where said cord engages the surface of the pocket, substantially as described.

3. A device of the character described, comprising a casing having a pocket in one side, said pocket having a relatively wide flaring outer end, said device having a pocket in its other side, an electric-wire-containing cord projected through the pocket into the casing, said pocket having a screw-threaded socket in its inner end, a clamping ring of flexible material around the cord, a plug screwed into the socket and pressing the clamping ring around the cord holding the latter against longitudinal movement, a wire coil around the cord extending throughout the length thereof where said cord engages the surface of the pocket, substantially as described.

4. A device of the character described, comprising a casing having a pocket in one side, said pocket having a relatively wide flaring outer end, said device having a pocket in its other side, an electric-wire-containing cord projected through the pocket into the casing, means securing the cord against longitudinal movement, a wire coil around the cord extending throughout the length thereof where said cord engages the surface of the pocket, and a removable plug screwed into the outer end of the pocket, substantially as described.

5. A device of the character described, comprising a casing having a pocket in one side, said pocket having a relatively wide flaring outer end, said device having a pocket in its other side, an electric-wire-containing cord projected through the pocket into the casing, said pocket having a screw-threaded socket in its inner end, a clamping ring of flexible material around the cord, a plug screwed into the socket and pressing the clamping ring around the cord holding the latter against longitudinal movement, a wire coil around the cord extending throughout the length thereof where said cord engages the surface of the pocket, and a removable plug screwed into the outer end of the pocket, substantially as described.

In testimony whereof I have signed my name to this specification in the presence of two subscribing witnesses.

GRANT WHEAT.

Witnesses:
C. R. ZIEGLER,
S. W. FOSTER.